United States Patent Office 3,388,794
Patented June 18, 1968

3,388,794
ELECTROSTATIC SEPARATION PROCESS AND CONDITIONING COMPOSITIONS THEREFOR
Gerd Karl Peuschel, Ronnenberg, Germany, assignor to Kali-Chemie Aktiengesellschaft, Hannover, Germany, a corporation of Germany
No Drawing. Filed Apr. 14, 1964, Ser. No. 359,785
Claims priority, application Germany, Apr. 19, 1963, K 49,514
8 Claims. (Cl. 209—9)

The present invention relates to an improvement in separating mixtures of granular solids such as minerals, and more particularly in the electrostatic separation of such mixtures and to compositions useful therein.

Electrostatic separation of minerals is often rather difficult because of the similar physical properties of the particles. Therefore, a pretreatment of many materials to be electrostatically separated is frequently required. Such a pretreatment may consist in heating the starting material to rather high temperatures, for instance, to 300° C. to 700° C. and, thereafter, to electrostatically separate the preheated material at a temperature between about 40° C. and about 220° C.

In order to reduce the considerable expenditure of energy required for such a preheating treatment, pretreatment with conditioning agents of different composition has been suggested, in order to impart to the various components of the mixture to be separated electrostatically differing properties.

Such a pretreatment with an active agent which shall be designated hereinafter and in the claims as "conditioning agent," however, has a number of disadvantages. Separation of the pretreated mixtures still requires relatively high separation temperatures and, as a result thereof, expenditure of considerable energy. Furthermore, many conditioning agents cannot be obtained in water-free condition. As a consequence thereof the mineral particles are covered with films of water or brines (i.e., solutions of the mineral in these water films) impairing the separation effect due to an occurring conductivity. Therefore, these water or brine films must be removed by operating at higher temperatures. Many sirupy, soap- and wax-like conditioning agents can be used only in form of their solutions thus also requiring higher pretreatment temperatures for the removal of the solvent. When using undiluted conditioning agents in pulverulent or fluid form, in many cases, the use of great amounts of expensive substances is necessary, whereby the benefication process becomes uneconomic.

It has been suggested to separate halite, i.e., natural sodium chloride, from sylvite, i.e., natural potassium chloride, by agitating the dry salt mixture with pieces of alundum containing an absorbed solution of octylamine hydrochloride and then with pieces of alundum containing absorbed oil. Thereby, the crystals of sylvite are selectively filmed with oil and become less conductive than the halite. However, alundum is fused alumina. It has only a small specific surface area and is not employed as fine powder but in the form of pieces. Therefore, only a small amount of the chemical conditioning agent is firmly absorbed by said aluminum oxide. As a result thereof, the active conditioning agent readily migrates from the alundum surface to the surface of the mineral particles whereon they generate a selective conductivity. Thus the alundum serves merely as an agent transferring the conditioning agent to the mineral particles.

It is now one object of the present invention to provide a simple and effective method of pretreating mixtures of granular solids and especially of granular minerals with conditioning agents prior to electrostatic separation.

Another object of the present invention is to provide highly effective conditioning compositions which are superior to the conditioning agents used heretofore.

Other objects of the present invention and advantageous features thereof will become apparent as the description proceeds.

In principle, the process according to the present invention consists in applying to the granular solid material to be separated the chemical conditioning agent not as such but deposited on a suitable carrier material. The carrier materials according to the present invention are characterized by an inherent large specific surface area. Such carriers as such do not at all or only slightly affect the separation of the mineral mixture. In general, the separating effect of the conditioning compositions according to the present invention having the active conditioning agent deposited on a carrier is even greater than the effect of the active conditioning agent when used as such.

Suitable carriers are inorganic and organic materials of an inherent large specific area, for instance, diatomaceous earth, kieselguhr, synthetic silicic acids, talc, calcium silicate, aluminum silicate, and other silicates as they are used as fillers in the rubber and plastics industry, metal oxides such as titanium dioxide, magnesium, oxide, iron oxide, aluminum oxide, manganese oxide, zinc oxide, hydroxides or oxide hydrates respectively, for instance, bayerite and other aluminum oxide hydrate modifications, the hydroxides of iron and manganese etc, activated charcoal, finely ground starch and cellulose, and related organic substances. It is understood that of course only those modifications of these substances are suitable which have an inherent large specific surface area. In general, substances having a specific surface area of at least 10 m.$^2$/g. are suitable for the purposes of this invention. The specific surface areas of the carrier materials used in the examples of this invention are in the range between 30 and 300 m.$^2$/g.

The usually used chemical conditioning agents, hereinafter called "active conditioning agents," are, for instance, acid anhydrides and anion-active compounds, i.e., compounds containing an acid or active hydrogen atom, as well as their metal compounds, such as carboxylic acids, amino acids, hydroxy carboxylic acids, halogenated carboxylic acids, polycarboxylic acids and their salts, amides and imides such as saccharin and potassium acid phthalic imide, enols, sulfonic acids and sulfonates, alkyl sulfates, phenols and phenolates, hydrocarbons with an active carbon atom such as fluorene, cyclopentadiene and cyclopentadienyl potassium, and others more.

Representative examples are among others: The sulfate of hydroxy stearic acid amide, the sodium salt of a sulfonated naphthyl ester, oleic acid, ricinic acid, hydroxy stearic acid, glutamic acid, and their sodium salts, mixtures of fatty acids $C_4$–$C_{10}$, mixtures of fatty acids $C_7$–$C_{12}$, mixtures of fatty acids $C_{12}$–$C_{18}$, mixtures of fatty acids $C_{14}$–$C_{22}$, linseed oil fatty acids, naphthenic acids (crude), shellac, alizarine yellow G (Color Index No. 36), Eosine (Color Index No. 768), Uranine (Color Index 766), benzoic acid, p-toluic acid, phenyl acetic acid and its sulfonated amide, cinnamic acid, salicylic acid, acetyl salicylic acid, phthalic acid, benzo orange R (Color Index No. 415), glycocoll dodecyl ester, rhodamine 3B extra (Color Index No. 751), olive oil, margarine, pentachloro phenol, α-nitroso-β-naphthol, β-nitroso-α-naphthol, α-naphthol, β-naphthol, pyrocatechol, pyrogallic acid, rosolic acid, murexide, saccharin (o-benzoic acid sulfimide), thioglycolic acid β-naphthyl amide, 5-nitro barbituric acid, the sodium salt of veronal (diethyl barbituric acid), diphenyl thiocarbazone, 1-(4-nitro phenyl) - 4 - nitro - 3- methyl pyrazolone, Autolrot RLP (Color Index No. 82), anthrone, "Phosokresol A" (compound of dithiophosphoric acid with cresol), "Phosokresol C" (compound of dithiophosphoric acid with cresol), 1,2,5,8-tetra-hydroxy anthraquinone, the potassium salt of phthalimide, a mixture of mannitol and boric acid 1:1 to 1:4, a mixture of pyrocatechol and phthalic acid 100:5, a mixture of fatty acids $C_4$–$C_{10}$ and the sodium salts of alkyl sulfonic acids 1:1, nonyl sulfate, the sodium salts of alkylsulfonic acids ("Mersolat 30" "Mersolat D," Bayer), the sodium salts of alkyl benzene sulfonic acids, the sodium salts of alkyl naphthalene sulfonic acids, "Lichtgrün SF" (Color Index No. 669), the sodium salt of benzoyl naphthalene sulfonic acid, the sodium salt of naphthyl ester sulfonic acid ("Dynesol," Almalgamated Chemical Corp.), sulfonated amides of fatty acids ("Xynomine," Onyx), alkyl sulfonates ("Witolatpaste," Imhausen), a mixture of the sodium salt of hydroxy stearic sulfonic acid ("Prästabitöl") and the sodium salt of sulfonated ricinic acid 1:1, a mixture of the sodium salt of hydroxy stearic sulfonic acid ("Prästabitöl") and the sodium salts of alkyl sulfonic acids ("Mersolat D") 1:1, mixtures of fatty acids $C_{14}$–$C_{22}$, "Phosokresol B" (compound of dithiophosphoric acid with cresol), tetramethyl diamino benzophenone (Michler's ketone) 6-sulfanil-2,4-dimethyl-pyrimidine ("Elkosin"), diphenyl thiocarbazone, Cupferron (ammonium nitroso - $\beta$ - phenyl hydroxylamine), pyrocatechol and phthalic acid 15:1, and others.

The deposition of the active conditioning agent on the large surface carrier can be achieved by any known method. For instance the active agent may be dissolved in water or an organic solvent to form a concentrated solution which is uniformly distributed over the carrier material so that a wet and crumbly mass is obtained which is then dried. When the active agent is a fluid, it is distributed as such on the carrier material, if necessary, while heating. If for any reason the solution of the active agent is more or less diluted, the carrier material may be immersed into this solution and, after evaporation of the water or the organic solvent, the composition is dried. Another way of manufacture consists in thoroughly mixing the active agent and the carrier and subsequently heating the mixture until the active agent is molten and adsorbed by the carrier material.

The compositions according to the present invention which have the active conditioning agent firmly attached to the large surface carrier do not serve to transfer the active conditioning agent to the mineral particles as achieved with the known alundum conditioning agent composition. They have an entirely different effect. The compositions act as such as conditioning agents or, respectively, they represent solid conditioning agents with a very considerably increased effective surface. No selective transfer of the conditioning agent to the mineral mixture takes place—as with the known alundum-conditioning agent combination. On the contrary, although all the mineral particles are uniformly coated with the composition according to the present invention, varying changes in the surface properties of the mineral particles, depending upon their composition, are achieved and these changes create different electric charges on the mineral particles as required for electrostatic separation.

The main advantage of the use of compositions according to the present invention is the considerable decrease in the temperature at which electrostatic separation can be effected. It is evident that great savings in energy will be achieved when taking into consideration that daily several thousand tons of mineral mixtures are to be worked up and electrostatically separated.

Furthermore, separation at room temperature, in many instances, renders possible the use of certain conditioning agents which otherwise cannot be employed for this purpose. Working at or near room temperature requires the absence of solvents, especially of water. The water or brine film which forms at low separating temperature on the surface of the mineral particles causes disturbances due to their inducing conductivity. Many effective active conditioning agents, for instance, sulfonates are not available in anhydrous form. Such agents, therefore, cannot be used for separation at low temperatures. However, when proceeding according to the present invention and depositing these agents from their solutions on carrier material of large surface area and evaporating the solvent, they can be employed as highly effective conditioning agents for separation at low temperature. This process is also applicable to many compounds which, although they can be uniformly distributed over the surface of the mineral particles when in dissolved form, cannot be used as such because of their consistency and their small specific surface. These compounds comprise, for instance, all sirupy, soapy, and wax-like compounds as well as those agents which cannot sufficiently be comminuted by any known method of production or, respectively, by grinding or milling. Only when applying such agents from their solutions to large surface carrier materials and evaporating the solvent or, respectively, when melting said substances and applying the molten agent to large surface carrier materials it is possible to produce sufficiently finely comminuted conditioning compositions which can satisfactorily be employed for electrostatic separation at low temperature.

The possibility to operate at low temperatures is of great practical importance because it permits to partly or completely save the thermal energy which otherwise is required for heating the mineral to be processed. Furthermore, to be able to effect electrostatic separation at low temperature represents a noteworthy advance in the art in all those instances whereby any supply of heat energy must be avoided for technical reasons, for instance, when operating below ground.

Other advantages achieved by proceeding according to the present invention are as follows:

(a) The use of solid active conditioning agents is economically feasible in many instances only by partly replacing the expensive conditioning agents by the much cheaper large surface carrier materials.

(b) As stated above, in general the large surface component of the compositions according to the present invention serves not only as carrier material but it also constitutes, in combination with the active conditioning agent component, a composition which is more effective than any amount of each of the components used alone.

Not only compositions consisting of an active conditioning agent and a carrier material, but also compositions which contain several members of the one or the other group of components or of both components can be prepared and used. Such compositions are produced by applying, for instance, the same conditioning agent to two or more carrier materials or by applying two or more active conditioning agents to the same carrier material. It is, of course, also possible to use mixtures of conditioning compositions containing two or more different components.

The relative amounts of active conditioning agent and carrier material in the compositions according to the present invention may vary widely depending on the kind of the components used. Relative amounts of one part of active condiioning component to about 2 parts to 20 parts of carrier material are the preferred amounts.

Before subjecting the minerals to electrostatic separation, they are comminuted according to known methods to such an extent that the crystals of the different components are separated from each other as far as possible. The particle size to which the minerals should be comminuted depends on the type of mineral to be separated and is known in the art.

Conditioning of the comminuted mineral mixture is carried out according to known methods. The amount of conditioning composition required is between about 50 g. and about 5000 g. of the conditioning composition, calculated as active conditioning agent and carrier, per ton of material to be processed. Amounts between 200 g. and 1000 g. per ton are the preferred amounts.

A suitable method of conditioning minerals by means of the agents according to the present invention consists in mixing the mineral and the conditioning agents in a mixer, until satisfactory distribution of the conditioning agent in the comminuted mineral particles is obtained. Surprisingly a rather short mixing period is sufficient to achieve a good conditioning effect. This mixing process can be carried out simultaneously with the grinding step of the mineral.

In many cases a further improvement can be attained if as an additional treatment to the chemical conditioning according to the present invention air conditioning is applied.

For this purpose the material to be processed is exposed to air having a water vapor pressure not above about 60%, and preferably not above 40%, of the water vapor pressure of a saturated solution of the mineral to be processed at the air conditioning and separating temperature when processing water-soluble minerals. When processing insoluble minerals, the relative humidity of the air shall not exceed about 60%, and preferably not about 40%, at the air conditioning and separating temperature.

This air conditioning treatment is preferably applied in those cases, where processing is effected at low temperatures. It may be applied before or after chemical conditioning and chemical conditioning is preferably carried out in an atmosphere of the above-given humidity. Even grinding of the mineral should be carried out under such humidity conditions, as especially favorable results are achieved when maintaining such atmospheric conditions during the whole beneficiation process. In any case it is important that these conditions are maintained immediately before electrostatic separation takes place.

The preconditioned mineral mixture is separated by means of a conventional electrostatic separator at a separation potential of 3 kv./cm. to 9 kv./cm. The separation temperature may vary between room temperature and the temperature at which one of the components of the conditioning composition is decomposed or evaporated and thus is lost. For economical reasons, the temperature should be as low as possible, i.e., about 50° C. or below, preferably below 40° C. The following examples are illustrative of the present invention but are not to be construed as limiting the scope thereof.

Tables I and II represent the results obtained on separating two types of crude potassium salts of different origin according to the method of the present invention. Table III represents the results obtained on chemical conditioning in combination with air conditioning.

The experiments were carried out in the following manner:

The minerals are ground to the grain sizes listed in the tables. Subsequently the ground mineral is thoroughly mixed with the conditioning composition. When beneficiating with amounts of about 300–500 g. of mineral, a mixing period of about 2 minutes is sufficient. When working with such small amounts, mixing by hand is sufficient.

Before the separation step, the conditioned mineral is heated to the temperature listed in the tables.

The material is then passed through a three step roller separator. The voltages applied are between 3 to 9 kv./cm. In a first step the mineral is separated into a preconcentrate and a tail fraction. The tail fraction is discarded and the preconcentrate is subjected to a second separation step, thereby separating it into a second concentrate and an intermediate fraction, which in a continuous process may be beneficiated further. The second concentrate may also be separated in further steps. If during the first separation step, the material cools down below 30° C., it is again heated to said temperature before the subsequent separation steps.

When the minerals were to be subjected to additional air conditioning (Table III), the ground and chemically conditioned material was spread in a drying over, the atmosphere of which was kept at 30° C. and a water vapor pressure as cited in the second column of said table. During chemical conditioning and separation, the water vapor pressure of the air was kept at the cited values.

The chemical conditioning compositions used for the experiments were prepared as follows:

The mixture of fatty acids with 6–12 carbon atoms and the oleic acid respectively, which are fluids at room temperature, were thoroughly mixed with colloidal silicic acid until they were completely absorbed by the silicic acid (Examples 2, 27, 28).

The mixture of fatty acids with 12–18 carbon atoms was mixed with the silicic acid, while heating 35–45° C. whereby the fatty acid mixture melted and thus was absorbed by the colloidal silicic acid (Examples 5, 17).

"Praestabitoel" was dissolved in water of room temperature (about 20 g. in 100 ml.) to form a concentrated solution which was thoroughly mixed with pulverulent active charcoal until the whole mass had a wet-crumbly appearance, afterwards it was dried at about 120° C. (Example 7).

The chemical conditioning agents with "Sultafon RN" (Example 6), saccharin (Examples 11, 12), sodium benzoate (Example 19), sodium laurylsulfate (Example 21), potassium hydrogen phthalate (Example 23), sodium cinnamate (Example 28), "Texapon 8" (Example 40) were prepared in the same manner, i.e., by adsorption of a concentrated aqueous solution of the active conditioning agent by the respective carrier material.

The compositions with β-naphthalene sulfonic acid (Example 8), β-naphthol (Examples 9, 22, 33, 34), α-nitroso-β-naphthol (Example 10), phthalic acid (Example 24) were prepared in an analogous manner whereby, in place of water, methanol or ethanol was used as solvent for the active conditioning agent and whereby the impregnated carrier was dried at about 80° C.

Phthalic acid anhydride (Examples 13, 35) salicylic acid (Example 18) as well as benzoic acid (Examples 25, 31) were attached to the carrier material from the molten state, i.e., the components were mixed in the solid state and the mixture was then heated to about 150° C. (phthalic anhydride), or to about 170° C. (salicylic acid), or to 130° C. (benzoic acid) respectively.

The composition of Example 14 was prepared by melting benzoic acid onto the colloidal silicic acid and subsequently mixing the thus impregnated carrier with the liquid fatty acid mixture. The composition of Example 15 was prepared in an analogous manner.

The process according to the present invention is by no means limited to the electrostatic separation of crude potassium salts. Tables IV and V represent results obtained on separating two other mineral mixtures. They show that any mineral mixture can successfully be processed by conditioning with a combination of active conditioning agent and a large surface carrier material.

In place of the starting materials processed by electrostatic separation according to the examples given in the tables, there may be subjected other starting materials, to such separation whereby the following minerals are separated from impurities or other minerals:

Tremolite (natural magnesium calcium silicate) from dolomite;
biotite mica from sand;
mica from quartz;
quartz from phosphate rock;
quartz from feldspar;
zircon (natural zirconium silicate) from quartz;
zircon from ilmenite and rutile;
ilmenite from quartz sand;
sphalerite (natural zinc sulfide) from pyrite;
spodumene (natural lithium aluminum silicate) from quartz, albite (soda-feldspar), microcline (natural potassium aluminum silicate);
ulexite (natural hydrous sodium calcium borate) from bentonite;
halite (natural sodium chloride) from sylvite dolomite from talc;

sphalerite from fluorite;
clay from kernite;
silicon carbide abrasive grains from grindings;
and many others.

Of course, many changes and variations in the large surface carrier material, the apparatus and conditions employed in electrostatically separating the components of the starting material, and the like may be made by those skilled in the art in accordance with the principles set forth herein and in the claims annexed hereto.

TABLE I

Feed: Hard salt, which is a mixture of sylvite (KCl), halite (NaCl), and kieserite ($MgSO_4 \cdot H_2O$) containing 11.7% $K_2O$. Ground to a grain size: 0–0.75 mm. Separation temperature: 30° C. Humidity of the atmosphere during processing: Below 8.5 mm. Hg.

| Ex. No. | Conditioning composition | g./ton | Yield, percent (pre-conc.) | Preconcentrate, percent $K_2O$ | Second concentrate, percent $K_2O$ |
|---|---|---|---|---|---|
| 1 | Without conditioning agent | | 51.1 | 13.8 | |
| 2 | Fatty acid mixture $C_6$ to $C_{12}$ | 500 | 79.5 | 22.1 | 35.6 |
| 3 | Fatty acid mixture $C_6$ to $C_{12}$ / On colloidal silicic acid | 40 / 160 | 92.2 | 32.5 | 58.7 |
| 4 | Fatty acid mixture $C_{12}$ to $C_{18}$ | 500 | 76.5 | 22.0 | 39.1 |
| 5 | Fatty acid mixture $C_{12}$ to $C_{18}$ / On colloidal silicic acid | 100 / 400 | 94.2 | 35.9 | 56.8 |
| 6 | "Sultafon RN," i.e. sodium salt of an ester sulfonate.[1] / On diatomaceous earth | 100 / 400 | 90.6 | 41.6 | 58.3 |
| 7 | "Praestabitöl," i.e. sodium salt of hydroxy stearic sulfonic acid.[1] / On active charcoal | 100 / 900 | 88.7 | 34.5 | 54.1 |
| 8 | β-Naphthalene sulfonic acid / On calcium silicate | 100 / 400 | 93.1 | 33.3 | 55.6 |
| 9 | β-Naphthol / On aluminum oxide | 50 / 450 | 96.1 | 32.4 | 53.9 |
| 10 | α-Nitroso-β-naphthol / On diatomaceous earth | 50 / 450 | 91.9 | 36.2 | 59.4 |
| 11 | Saccharin / On aluminum silicate | 100 / 400 | 87.4 | 34.3 | 51.9 |
| 12 | Saccharin / On cellulose powder | 100 / 400 | 90.7 | 34.9 | 54.6 |
| 13 | Phthalic anhydride / On colloidal silicic acid | 100 / 400 | 92.9 | 35.7 | 56.1 |
| 14 | Fatty acid mixture $C_6$ to $C_{12}$ / And benzoic acid / On colloidal silicic acid | 50 / 50 / 400 | 94.3 | 36.1 | 60.2 |
| 15 | Fatty acid mixture $C_6$ to $C_{12}$ / On diatomaceous earth / And phthalic acid anhydride / On colloidal silicic acid | 50 / 200 / 50 / 200 | 96.4 | 33.7 | 56.9 |

[1] Sold by the firm Stockhausen & Cie., Germany.

TABLE II

Feed: Sylvinite (NaCl+KCl) with 14.3% $K_2O$
Ground to a grain size: 0–0.75 mm.
Separation temperature: 30° C.
Humidity of the atmosphere during processing: Below 9 mm. Hg

| Ex. No. | Conditioning composition | g./ton | Yield, percent (pre-conc.) | Preconcentrate, percent $K_2O$ | Second concentrate, percent $K_2O$ |
|---|---|---|---|---|---|
| 16 | Without conditioning agent | | 47.0 | 22.1 | |
| 17 | Fatty acid mixture $C_{12}$ to $C_{18}$ / On diatomaceous earth | 50 / 200 | 95.6 | 38.3 | 58.1 |
| 18 | Salicylic acid / On colloidal silicic acid | 100 / 400 | 96.1 | 37.9 | 58.8 |
| 19 | Sodium benzoate / On calcium silicate | 100 / 400 | 94.2 | 40.1 | 59.5 |
| 20 | "Sultafon RN" / On diatomaceous earth | 100 / 400 | 92.9 | 41.2 | 60.1 |
| 21 | Sodium lauryl sulfate / On calcium silicate | 100 / 400 | 93.8 | 36.5 | 55.9 |
| 22 | β-Naphthol / On aluminum oxide | 40 / 160 | 95.3 | 38.3 | 59.2 |
| 23 | Potassium hydrogen phthalate / On potato starch | 100 / 400 | 90.9 | 36.6 | 56.7 |
| 24 | Phthalic acid / On talc | 100 / 900 | 93.8 | 37.5 | 60.4 |

TABLE III

Feed: Hard salt (mixture of sylvite, halite, and kieserite) with 11.7% $K_2O$.
Ground to a grain size: 0–0.75 mm.
Conditioning and separation temperature: 30° C.

| Example No. | Conditioning composition | G./ton | $PH_2O$[1] in air, mm. Hg | Percent of Saturation[2] | Yield, percent (preconcentrate) | Preconcentrate, percent $K_2O$ | Second concentrate, percent $K_2O$ |
|---|---|---|---|---|---|---|---|
| 25 | Benzoic acid | 500 | 6.1 | 25.4 | 90.1 | 29.5 | 48.0 |
| 26 | Benzoic acid / On colloidal silicic acid | 100 / 400 | 6.1 | 25.4 | 95.3 | 34.1 | 54.3 |
| 27 | Fatty acid mixture $C_6$ to $C_{12}$ / On diatomaceous earth | 100 / 400 | 6.7 | 28.0 | 91.5 | 34.1 | 57.1 |
| 28 | Sodium cinnamate / On bayerite | 50 / 450 | 8.1 | 33.8 | 91.8 | 35.2 | 55.8 |

[1] $PH_2O$ = water vapor pressure.
[2] The values are based on the vapor pressure of a saturated mineral salt solution at the mentioned temperature.

TABLE IV

Feed: Fluorite with 52.2% CaF$_2$.
Ground to a grain size: 0–1.0 mm.
Gangue: Feldspar, barite.
Separation temperature: 30° C.
Humidity of the atmosphere during processing: Below 9 mm. Hg.

| Ex. No. | Conditioning composition | G./ton | Yield, percent | First concentrate, percent CaF$_2$ |
|---|---|---|---|---|
| 29 | Without conditioning agent | | 78.8 | 61.6 |
| 30 | Salicylic acid / On diatomaceous earth | 100 / 400 | 95.9 | 90.1 |
| 31 | Benzoic acid / On colloidal silicic acid | 100 / 400 | 94.6 | 94.5 |
| 32 | "Sultafon RN" / On diatomaceous earth | 100 / 400 | 98.7 | 86.8 |
| 33 | β-Naphthol / On talc | 100 / 400 | 99.1 | 86.9 |
| 34 | β-Naphthol / On aluminum oxide | 100 / 400 | 97.8 | 90.4 |
| 35 | Phthalic acid anhydride / On colloidal sillicic acid | 100 / 400 | 95.6 | 84.3 |

TABLE V

Feed: Barite with 88.4% BaSO$_4$; ground to a grain size: 0–0.4 mm.
Gangue: Quartz, ferric oxide, aluminum oxide.
Separation temperature: 50° C.
Humidity of the atmosphere: Below 15 mm. Hg.

| Ex. No. | Conditioning composition | G./ton | Yield, percent | First concentrate, percent BaSO$_4$ |
|---|---|---|---|---|
| 36 | Without conditioning agent | | 80.8 | 92.6 |
| 37 | Fatty acid mixture C$_{12}$-C$_{18}$ / On colloidal silicic acid | 200 / 800 | 95.2 | 98.1 |
| 38 | Oleic acid / On colloidal silicic acid | 100 / 400 | 95.9 | 97.9 |
| 39 | Sodium lauryl sulfate / On calcium silicate | 100 / 400 | 97.2 | 96.9 |
| 40 | "Texapon Z"=Sodium salts of sulfuric acid esters of saturated fatty alcohols.[2] / On calcium silicate | 100 / 400 | 96.2 | 97.5 |
| 41 | Potassium hydrogen phthalate / On potato starch | 100 / 400 | 94.5 | 98.0 |

[2] Sold by the firm DEHYDAG, Dusseldorf, Germany.

I claim:

1. In a process of electrostatically separating the components of solid granular mixtures by treating the mixture to be separated with a conditioning agent and subjecting the thus preconditioned mixture to electrostatic separation, the improvement which consists in mixing the mixture to be separated with a finely comminuted solid conditioning composition composed of an organic conditioning agent changing the surface properties of the particles of the mixture to be separated and creating different electric charges on said particles, said conditioning agent being deposited on a solid carrier material with a specific surface area of at least 10 sq. m./g., selected from the group consisting of silicic acids, silicates, aluminum oxide, activated charcoal, starch and cellulose the amount of the carrier material in said composition being at least twice the amount of the conditioning agent therein, thereby well distributing said conditioning composition in the mixture to be separated.

2. The process according to claim 1, wherein preconditioning and separation is carried out at a temperature between room temperature and about 50° C.

3. The process according to claim 1, wherein the conditioning composition is applied in amounts between about 50 g. and about 5000 g. per ton of mixture.

4. The process according to claim 1, wherein the conditioning composition is applied in amounts between 200 g. and 1000 g. per ton of mixture.

5. The process according to claim 1, wherein the conditioning agent is an anion-active compound.

6. The process according to claim 1, wherein the solid granular mixture to be separated electrostatically is a mixture of minerals.

7. The process according to claim 1, wherein the solid granular mixture to be separated electrostatically is a mixture of water-soluble minerals and wherein said mixture is exposed, before electrostatic separation, to air of a water vapor pressure below 60% of the water vapor pressure of a saturated solution of said mixture of minerals at the air conditioning and separating temperature.

8. The process according to claim 1, wherein the solid granular mixture to be separated electrostatically is a mixture to be separated electrostatically is a mixture of water-insoluble minerals and wherein said mixture is exposed, before electrostatic separation, to air of a relative humidity below 60% at the air conditioning and separating temperature.

References Cited

UNITED STATES PATENTS

| | | | |
|---|---|---|---|
| 173,607 | 2/1876 | Fehr | 167—92 X |
| 959,646 | 5/1910 | Swart | 209—9 X |
| 1,995,663 | 3/1935 | Bollmann | 167—92 X |
| 2,091,075 | 8/1937 | Landers | 167—42 X |
| 2,146,739 | 2/1939 | Heath | 167—42 X |
| 2,180,804 | 11/1939 | Fahrenwald | 209—127.1 |
| 2,430,015 | 11/1947 | Hatton | 209—127 X |
| 2,556,483 | 6/1951 | Peery | 209—127.1 |
| 2,593,431 | 3/1952 | Fraas | 209—9 |
| 2,997,171 | 8/1961 | Samsel | 209—4 |
| 3,180,754 | 4/1965 | Acker | 117—100 |

FOREIGN PATENTS

| | | |
|---|---|---|
| 720,635 | 5/1942 | Germany. |
| 1,095,762 | 12/1960 | Germany. |

OTHER REFERENCES

Bulletin 603 Bureau of Mines, Electrostatic Sep. of Granular Materials, page 63, 1962.

HARRY B. THORNTON, *Primary Examiner.*

R. HALPER, *Assistant Examiner.*